(12) United States Patent
Desneux et al.

(10) Patent No.: US 10,562,368 B2
(45) Date of Patent: Feb. 18, 2020

(54) METHOD AND SYSTEM FOR HEATING A PASSENGER COMPARTMENT OF AN ELECTRIC VEHICLE, AND ELECTRIC VEHICLE IMPLEMENTING SUCH A METHOD OR SYSTEM

(71) Applicant: BLUEBUS, Ergue Gaberic (FR)

(72) Inventors: Alexandre Desneux, Saint Laurent de Mure (FR); Fabien Durand, Decines (FR); Christophe Bardot, Montigny-le-Bretonneux (FR)

(73) Assignee: BLUEBUS, Ergue Gaberic (FR)

( * ) Notice: Subject to any disclaimer, the term of this patent is extended or adjusted under 35 U.S.C. 154(b) by 85 days.

(21) Appl. No.: 15/766,700

(22) PCT Filed: Nov. 9, 2016

(86) PCT No.: PCT/EP2016/077108
§ 371 (c)(1),
(2) Date: Apr. 6, 2018

(87) PCT Pub. No.: WO2017/084935
PCT Pub. Date: May 26, 2017

(65) Prior Publication Data
US 2018/0297440 A1    Oct. 18, 2018

(30) Foreign Application Priority Data
Nov. 16, 2015 (FR) .................... 15 60979

(51) Int. Cl.
*B60H 1/03* (2006.01)
*B60H 1/14* (2006.01)
(Continued)

(52) U.S. Cl.
CPC ..... *B60H 1/00371* (2013.01); *B60H 1/00257* (2013.01); *B60H 1/00392* (2013.01);
(Continued)

(58) Field of Classification Search
CPC .......... B60H 1/00371; B60H 1/00392; B60H 1/00657; B60H 1/00778; B60H 1/143;
(Continued)

(56) References Cited

U.S. PATENT DOCUMENTS 5,067,652 A    11/1991  Enander
10,124,651 B2 *  11/2018  Blatchley ............... B60H 1/034
(Continued)

FOREIGN PATENT DOCUMENTS

DE    102012019624 A1    4/2013
DE    102013001749 A1    7/2014

OTHER PUBLICATIONS

French Search Report from French Patent Application No. 1560979, dated Jul. 21, 2016.
International Search Report from International Patent Application No. PCT/EP2016/077108, dated Mar. 15, 2017.
Written Opinion from International Patent Application No. PCT/EP2016/077108, dated Mar. 15, 2017.

*Primary Examiner* — Gregory L Huson
*Assistant Examiner* — Daniel E Namay
(74) *Attorney, Agent, or Firm* — Greer, Burns & Crain, Ltd.

(57) ABSTRACT

A method for heating the passenger compartment of an electric vehicle, including the following steps:
  pre-heating at least one part of the passenger compartment by at least one electric heater when the vehicle is connected to an external energy source, and
  heating the at least one part of the passenger compartment by a combustion heater when the vehicle is in use.
Also provided is a system implementing such a method and an electric vehicle, in particular of the electric bus type, utilizing such a method or such a system.

16 Claims, 2 Drawing Sheets

(51) Int. Cl.
    *B60H 1/22*     (2006.01)
    *B60H 1/00*     (2006.01)
    *B60L 1/02*     (2006.01)

(52) U.S. Cl.
    CPC ..... *B60H 1/00657* (2013.01); *B60H 1/00778* (2013.01); *B60H 1/143* (2013.01); *B60H 1/2206* (2013.01); *B60H 1/2218* (2013.01); *B60L 1/02* (2013.01); *B60H 2001/2234* (2013.01); *B60H 2001/2243* (2013.01); *B60H 2001/2262* (2013.01); *B60L 2200/18* (2013.01)

(58) Field of Classification Search
    CPC ................ B60H 1/2206; B60H 1/2218; B60H 1/00257; B60H 2001/2234; B60H 2001/2243; B60H 2001/2262; B60H 2200/18; B60H 1/03; B60H 1/14; B60H 1/22
    USPC .................................................. 237/5, 12, 81
    See application file for complete search history.

(56) References Cited

U.S. PATENT DOCUMENTS

| | | | |
|---|---|---|---|
| 10,279,650 B2* | 5/2019 | Maranville | B60H 1/00392 |
| 2013/0168458 A1* | 7/2013 | Ichishi | B60H 1/004 237/2 A |
| 2013/0292482 A1* | 11/2013 | Hashigaya | B60H 1/00007 237/28 |
| 2016/0318499 A1* | 11/2016 | Yamanaka | B60W 10/06 |
| 2016/0332505 A1* | 11/2016 | Yamanaka | B60H 1/143 |
| 2017/0080778 A1* | 3/2017 | Suzuki | B60H 1/00921 |
| 2017/0174045 A1* | 6/2017 | Shimauchi | B60H 1/00064 |
| 2017/0282689 A1* | 10/2017 | Miyakoshi | F25B 49/02 |

\* cited by examiner

METHOD AND SYSTEM FOR HEATING A PASSENGER COMPARTMENT OF AN ELECTRIC VEHICLE, AND ELECTRIC VEHICLE IMPLEMENTING SUCH A METHOD OR SYSTEM

BACKGROUND

The present invention relates to a method for heating the passenger compartment of an electric vehicle, in particular of an electric vehicle in which all of the energy for the movement thereof is provided by an on board electrical energy source which can be recharged from an external source. It also relates to a system implementing such a method and an electric vehicle, in particular of the bus type, utilizing such a method or such a system.

The field of the invention is the field of heating systems for an electric vehicle, and in particular for an electric vehicle in which all of the energy for the movement thereof is provided by an on board electrical energy source which can be recharged from an external source.

STATE OF THE ART

The bus is one of the most valued means of public transport because its utilization does not require specific infrastructure, for example of the track type. Electric buses are emerging in order to reduce pollution associated with public transport, encouraged both by user awareness and also by administrative incentives promoting the purchase and use of electric vehicles. We are also witnessing the emergence and development of tyred trams. Thus, the number of buses, electric or otherwise, is continuously increasing.

For electric buses supplied by rechargeable batteries from an external source, in contrast to hybrid buses, the operating range is a key issue. In order to increase the operating range of these buses, a combustion heater is used in order to heat the passenger compartment. Thus, the energy required to heat the passenger compartment is not taken from the batteries.

Now, the combustion heater cannot be used all of the time, for example, when the vehicle is in the garage. In addition, a combustion heater increases the pollution generated by the electric vehicle and the fuel consumption of said vehicle.

A purpose of the present invention is to overcome these drawbacks.

Another purpose of the invention is to propose a method and a system for heating the passenger compartment of an electric vehicle that can be used even when the vehicle is stopped.

A purpose of the invention is also to propose a method and a system for heating the passenger compartment of an electric vehicle that generates less pollution.

Yet another purpose of the invention is to propose a method and a system for heating the passenger compartment that reduces the fuel consumption of said electric vehicle.

SUMMARY

The invention makes it possible to achieve at least one of these aims by means of a method of heating the passenger compartment of an electric vehicle, characterized in that it comprises the following steps:
   pre-heating at least one part of said passenger compartment, in particular a passenger area or a driver's area, by at least one electric heater when said vehicle is connected to an external electrical source, such as the power grid, for example, and
   heating said at least one part of said passenger compartment by means of a combustion heater, when said vehicle is in use.

Thus, the method according to the invention proposes to carry out a phase of pre-heating the vehicle with an electric heater when the vehicle is connected to an external electrical source, such as the power grid, for example. In this case, the electric heater is supplied by the external electrical source, directly or via the batteries of the vehicle. Such a situation can occur when the vehicle is stopped in order to recharge its batteries or when the vehicle is in a garaged phase waiting to be used. Then, when the vehicle is disconnected in order to be used, for example on the road, heating the vehicle is carried out by a combustion heater, so that the heating does not consume electrical energy stored in the batteries of the electric vehicle.

As a result, by means of the method according to the invention, the passenger compartment of an electric vehicle can be heated even when the vehicle is stopped, while reducing the pollution generated by the electric vehicle and the fuel consumption of said electric vehicle.

In the present application, a "tyred tram" denotes an electric public transport land vehicle mounted on wheels and which is recharged at each station, so that it has no need for heavy infrastructures of the rails or catenaries type on the road system. Such an electric vehicle is recharged at each station by means of charging elements of the station and a connector connecting said vehicle to said station.

According to the invention, the heating step and/or the pre-heating step can affect only a part of the passenger compartment of the vehicle, such as a driver's position of the vehicle.

Alternatively, the heating step and/or the pre-heating step can affect the entire passenger compartment of the vehicle.

The method according to the invention can advantageously comprise a step of initiating, in particular remote from the vehicle, the pre-heating step.

Such a pre-heating step can be initiated by a timer incorporated in the vehicle.

Alternatively, such a pre-heating step can be initiated by a remote device, for example a remote server or a portable user device, through a wireless or wired communication network. Such a pre-heating step can also be initiated by an electrical recharging terminal to which the vehicle is connected.

The connection between the server and/or the recharging terminal can be carried out in a wired manner, for example by means of the pilot wire of a recharging cable connecting said vehicle to said recharging terminal. Alternatively, the connection between the server and/or the recharging terminal and/or the user device can be carried out wirelessly, for example through a wireless communication network, such as the network used for mobile telephony.

The pre-heating step can, alternatively or in addition, be initiated automatically as a function of at least one of the following parameters:
   a predetermined time,
   a predetermined period before said vehicle is collected, for example following an inactive/garaged phase of the vehicle,
   an external temperature, and
   an internal temperature in the at least one part of the passenger compartment.

According to an embodiment example that is in no way imitative, the pre-heating step can be initiated when the driver comes to collect the vehicle, for example in the morning, for example 30 minutes before the time at which the vehicle is collected.

In certain cases, the heating step can also be carried out by the electric heater, in addition to the combustion heater.

In this case, the electric heater continuously or temporarily provides additional heating, for example when the combustion heater is insufficient, as a function of the temperature requested in the passenger compartment.

Advantageously, the pre-heating step can be carried out without starting the one or more electric motors of the electric vehicle.

In other words, use of the electric heater can be completely independent of use of the one or more electric motors for driving the electric vehicle.

The heating step can be automatically initiated when:
the pre-heating step is stopped,
the vehicle begins to move,
the vehicle is disconnected from an external electrical source, and/or
the temperature inside the at least one part of the passenger compartment which was pre-heated reaches a predetermined temperature;
immediately or optionally after a predetermined period following at least one of these events.

Initiation of the heating step can also be conditional on manual confirmation by an operator or a driver of said vehicle.

Alternatively, the heating step can be initiated manually, for example by a driver of said vehicle.

The pre-heating step can be automatically stopped when:
the heating step is initiated,
the vehicle begins to move,
the vehicle is disconnected from an external electrical source, and/or
the temperature inside the at least one part of the passenger compartment which was pre-heated reaches a predetermined temperature;
immediately or optionally after a predetermined period following at least one of these events.

Stopping the pre-heating step can also be conditional on manual confirmation by an operator or a driver of said vehicle.

Alternatively, the pre-heating step can be stopped manually, for example by a driver of said vehicle.

Advantageously, the pre-heating step and the heating step can be carried out by thermal energy transfer to a heat transfer fluid.

The heat transfer fluid for the heating step and the pre-heating step can be one and the same heat transfer fluid.

The heat transfer fluid can be water.

In a non-limitative embodiment, the pre-heating step can carry out pre-heating only in a passenger area or a driver's area of the vehicle.

According to another aspect of the invention, a system for heating the passenger compartment of an electric vehicle is proposed, characterized in that it comprises:
at least one electric heater configured in order to carry out pre-heating of at least one part of said passenger compartment, in particular of a passenger area or a driver's area of said vehicle, when said vehicle is connected to an external energy source, such as the power grid, for example, and
at least one combustion heater for heating said at least one part of said passenger compartment when said vehicle is in use.

The at least one electric heater, respectively the at least one combustion heater, can carry out pre-heating, respectively heating, of the passenger compartment via a heat transfer fluid such as water, for example.

In this case, the at least one electric heater and the at least one combustion heater can heat one and the same heat transfer fluid.

Thus, the heating system is simple to utilize, more efficient in terms of output and less costly.

According to a non-limitative embodiment, when heating of the passenger compartment is carried out via a heat transfer fluid, the system according to the invention can comprise:
a circuit for circulating said fluid in the passenger compartment of the vehicle, and
at least one heat exchanger, in particular water-air, in order to transfer the heat from said heat transfer fluid to said passenger compartment, connected to said circuit.

Moreover, in a preferred version that is in no way limitative, particularly suited to the needs of a public transport vehicle:
the electric heater can have a power greater than or equal to 5 kW, and/or
the combustion heater can have a power greater than or equal to 15 kW.

According to another aspect of the same invention, an electric vehicle is proposed comprising:
a heating system according to the invention; or
means for implementing all the steps of the method according to the invention.

The electric vehicle according to the invention can in particular be an electric public transport land vehicle, in particular on rails or on roads, of the bus, coach or tyred tram type, for example.

The vehicle according to the invention comprises one or more electrical energy storage module that can be recharged from an external source, such as the power grid.

Each rechargeable electrical energy storage module can comprise one or more rechargeable battery(ies) or supercapacitor(s).

To this end, the vehicle is equipped with at least one socket and/or an electrical recharging cable. Such a cable and/or such a socket can comprise a pilot wire making it possible to:
communicate with the vehicle, and/or
detect the connection and/or the disconnection of said vehicle from an external electrical source.

BRIEF DESCRIPTION OF DRAWINGS

Other advantages and characteristics will become apparent on examination of the detailed description of an embodiment which is in no way limitative, and the attached drawings, in which.

DETAILED DESCRIPTION

It is understood that the embodiments which will be described below are in no way limitative. It is possible in particular to imagine variants of the invention comprising only a selection of features described below in isolation from the other features described, if this selection of features is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the figures, elements common to several figures retain the same reference.

Figure 1:
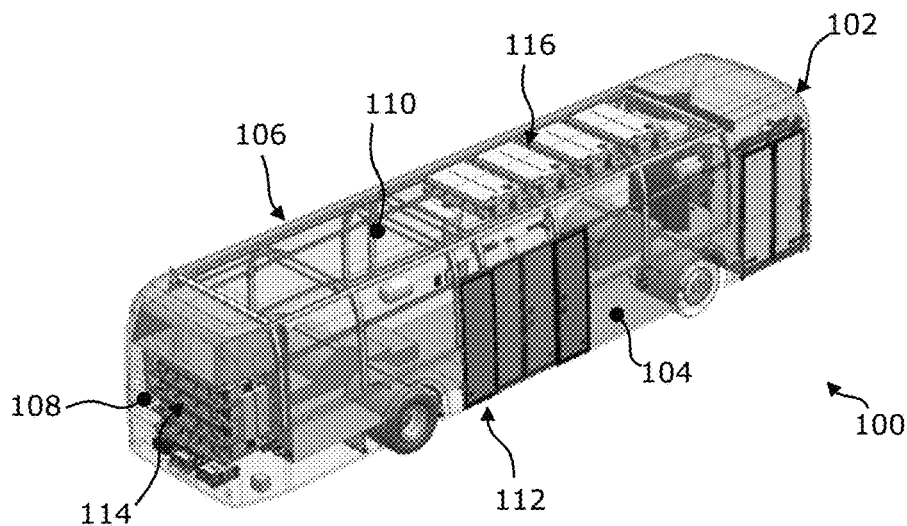
FIG. 1 is a diagrammatic representation of a non-limitative example of an electric vehicle according to the invention.

FIG. 1 is a diagrammatic representation of a non-limitative example of an electric vehicle according to the invention.

The electric vehicle 100 shown in FIG. 1 is an electric bus including a passenger compartment delimited by a front panel 102, two longitudinal side panels 104 and 106, a rear panel 108, an upper panel 110 and a lower panel 112.

The electric bus comprises one or more electric motors (not shown), electrical energy storage modules 114, called rear modules, placed near to the rear panel 108. The bus 100 also comprises electrical energy storage modules 116, called upper modules, placed in a recess arranged in the upper panel 110 of the bus 100.

The electric bus 100 is moved exclusively by electrical energy provided by the electrical energy storage modules 114 and 116, which can be batteries or supercapacitors.

The electrical energy storage modules 114 and 116 are recharged from an external electrical source, via a recharging cable, optionally comprising a pilot wire.

The passenger compartment of the electric bus 100 is heated by a heating system according to the invention implementing a heating method according to the invention.

Figure 2:
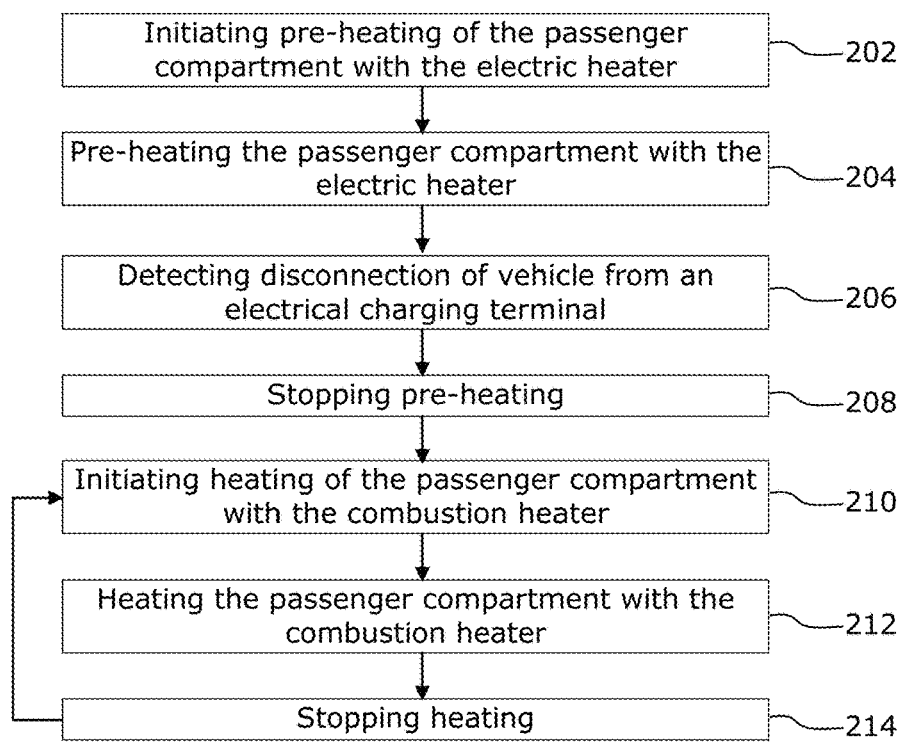
FIG. 2 is a diagrammatic representation of a non-limitative example of a method according to the invention.

FIG. 2 is a diagrammatic representation of a non-limitative example of a method according to the invention.

The method 200, shown in FIG. 2, comprises a step 202 of initiating pre-heating of the passenger compartment, or of at least one part of the passenger compartment such as the driver's position, for example, of the bus 100 in FIG. 1. The pre-heating step is carried out by an electric heater, supplied by an electrical source external to the vehicle, to which said vehicle is connected directly or via one or more batteries, such as the power grid, for example.

The initiation step 202 comprises starting the electric heater.

The initiation step is carried out automatically, for example by a timer incorporated in the vehicle and controlling the supply to the electric heater.

Alternatively, initiation of the pre-heating step can be carried out by a remote server or by a recharging terminal. The connection between the server and/or the recharging terminal can be carried out in a wired manner, for example by means of the pilot wire of a recharging cable connecting said vehicle to said recharging terminal.

Alternatively, the connection between the server and/or the recharging terminal can be carried out wirelessly, for example through a wireless communication network, such as the communication network used for mobile telephony.

According to an embodiment example, the pre-heating step is initiated 15 minutes before the time the vehicle is collected for use after an inactive step of the vehicle.

Initiation of pre-heating of the vehicle can be conditional on detecting the connection of said vehicle to an external electrical source. Such detecting of the connection can be carried out via a pilot wire of the recharging cable or of the recharging terminal of the electric vehicle.

A step 204 carries out pre-heating of at least one part, or the entirety, of the passenger compartment of the vehicle by the electric heater. The pre-heating step is carried out until a predetermined temperature is reached, for example 15° C., and while the electric vehicle remains connected to the external electrical source. In fact, the electric heater is supplied, at least mainly, by the external electrical source.

Pre-heating is carried out by heating, by the electric heater, of a heat transfer fluid such as water. The heat stored by the fluid is then exchanged with the air present in at least one part of the passenger compartment, such as the driving position, by means of one or more water-air heat exchangers, also called exchanger in the present application.

A step 206 detects the disconnection of the vehicle from the external electrical source. Such a detection can be carried out automatically using the pilot wire of the recharging cable or of the recharging terminal of the electric vehicle.

After detecting the disconnection, a step 208 carries out stopping the pre-heating by the electric heater.

After the pre-heating is stopped, a step 210 carries out initiation of the heating, either of the part of the passenger compartment that was pre-heated during step 204, or of the entirety of the passenger compartment, with a combustion heater, for example a heater operating on biofuel, when the temperature in the passenger compartment is less than a desired temperature, for example 18° C. The step 210 of initiating the heating step can be conditional on the carrying out of at least one additional condition such as movement of the vehicle, or manual confirmation by the driver, or the absence of a connection of the vehicle to an external electrical source, etc.

A step 212 then carries out heating either of the part of the passenger compartment that was pre-heated during the step 204, or of the entirety of the passenger compartment with the combustion heater in order to reach a pre-set desired temperature and as long as the additional conditions given above are respected.

Heating is carried out by heating, by the combustion heater, of the same heat transfer fluid as that used for pre-heating.

When the desired temperature is reached, or when one of the additional conditions is not respected, or even at the request of the driver, a step 214 stops the heating.

Steps 210-214 are then reiterated as often as necessary in order to maintain a desired temperature in the passenger compartment of the electric vehicle.

Figure 3:
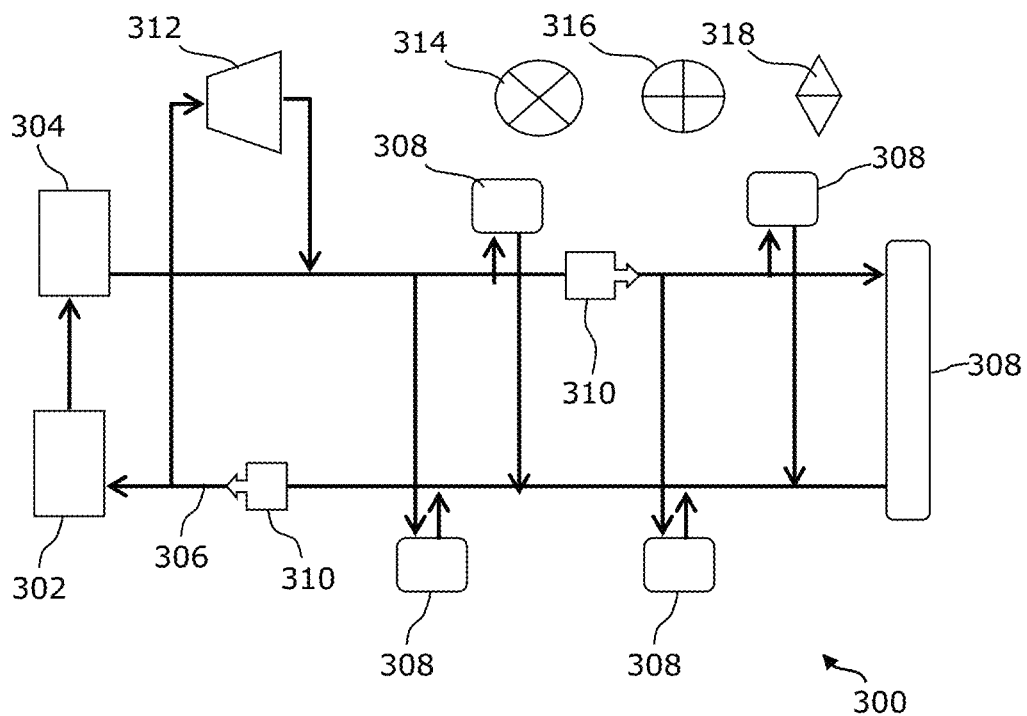
FIG. 3 is a diagrammatic representation of a non-limitative example of a heating system according to the invention.

FIG. 3 is a diagrammatic representation of a non-limitative example of a heating system according to the invention.

The system 300 shown in FIG. 3 comprises an electric heater 302 arranged in series with a combustion heater 304, and in particular a biofuel combustion heater, on a heating circuit 306 in which a heat transfer fluid such as water circulates. The system also comprises, connected to the heating circuit 306:
- one or more heat exchangers 308, distributed in the passenger compartment of the vehicle in order to transfer the heat stored by the heat transfer fluid to the air inside the passenger compartment;
- one or more pumps 310 for circulating the heat transfer fluid in the heating circuit;
- an expansion tank 312.

The system 300 also comprises a means 314 for drawing fresh air into the passenger compartment, means 316 for extracting exhaust air out of the passenger compartment, as well as a thermometer 318, or equivalent, in order to measure and communicate the temperature.

The system also comprises a central module (not shown), such as an electronic board, a processor or equivalent, for initiating and stopping the electric heater and the combustion heater as a function of the data given above.

Figure 4:
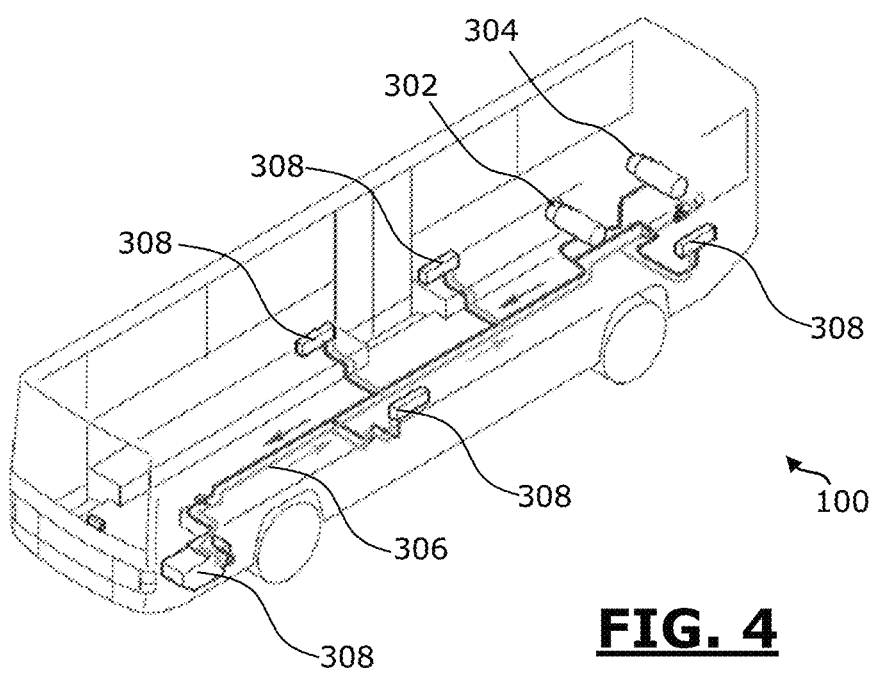
FIG. 4 is a partial diagrammatic representation of the vehicle of FIG. 1 with the system of FIG. 3.

FIG. 4 is a partial diagrammatic representation of the bus in FIG. 1 with the system in FIG. 3.

As shown in FIG. 4, the heat transfer circuit 306 runs around the main part of the vehicle 100 in the lengthwise direction, for example substantially in a central part of the floor of the vehicle 100, so that it is substantially arranged at an equal distance from the side panels of the vehicle 100.

The electric heater 302 and the combustion heater 304 are placed in the rear part of the vehicle, under the floor of the vehicle 100.

A heat exchanger 308, commonly called HVAC, is placed under the driving position at the front of the vehicle. The other heat exchangers 308 are arranged in the side panels, and more particularly in the thickness of the side panels, along the entire vehicle.

According to an embodiment example, the electric heater 302 has a power greater than or equal to 5 kW.

According to an embodiment example, the combustion heater 304 has a power greater than or equal to 15 kW.

Of course, the invention is not limited to the examples which have just been described.

The invention claimed is:

1. A method for heating the passenger compartment of an electric vehicle in which all of the energy for the movement thereof is provided by an on board electrical energy source that can be recharged from an external source, said method comprising the following steps:
    pre-heating at least one part of said passenger compartment by at least one electric heater when said vehicle is connected to an external energy source;
    heating said at least one part of said passenger compartment by a combustion heater when said vehicle is in use; and
the pre-heating step carries out pre-heating only of a driver's area of said vehicle.

2. The method according to claim 1, characterized in that it comprises a step of initiating, in particular remotely from the vehicle, the pre-heating step.

3. The method according to claim 1, characterized in that the heating step is also carried out by the electric heater in addition to the combustion heater.

4. The method according to claim 1, characterized in that the pre-heating step is carried out without starting the one or more electric motors of said electric vehicle.

5. The method according to claim 1, characterized in that the pre-heating step is automatically initiated as a function of at least one of the following parameters:
    a predetermined time,
    a predetermined period before said vehicle is collected, for example following an inactive/garaged phase of the vehicle,
    an external temperature, and
    an internal temperature in the at least one part of the passenger compartment.

6. The method according to claim 1, characterized in that the heating step is automatically initiated when:
    the pre-heating step is stopped,
    the vehicle begins to move,
    the vehicle is disconnected from an external energy source, and/or
    the temperature inside the at least one part of the passenger compartment which was pre-heated reaches a predetermined temperature;
immediately or optionally after a predetermined period following at least one of these events.

7. The method according to claim 1, characterized in that the pre-heating step is automatically stopped when:
    the heating step is initiated,
    the vehicle begins to move,
    the vehicle is disconnected from an external electrical source, and/or
    the temperature inside the at least one part of the passenger compartment which was pre-heated reaches a predetermined temperature;
immediately or optionally after a predetermined period following at least one of these events.

8. The method according to claim 1, characterized in that initiating the heating step, respectively stopping the pre-heating step, is conditional on manual confirmation by an operator or a driver of the vehicle.

9. The method according to claim 1, characterized in that the pre-heating step and the heating step are carried out by thermal energy transfer to a same heat transfer fluid.

10. A system for heating the passenger compartment of an electric vehicle, in which all of the energy for the movement thereof is provided by an on board electrical energy source that can be recharged from an external source, said system comprising:
    at least one electric heater configured in order to carry out pre-heating of at least one part or said passenger compartment when said vehicle is connected to an external energy source;
    at least one combustion heater for heating said at least one part of said passenger compartment when said vehicle is in use; and
the electric heater is configured in order to carry out pre-heating only in a driver's area of said vehicle.

11. The system according to claim 10, characterized in that heating of the passenger compartment is carried out via a single heat transfer fluid and the at least one electric heater and/or the at least one combustion heater heat said single heat transfer fluid.

12. The system according to claim 10, characterized in that heating of the passenger compartment is carried out via a heat transfer fluid, said system comprising:
    a circuit for circulating said fluid in the passenger compartment of the vehicle, and
    at least one heat exchanger for transferring the heat from said heat transfer fluid to said passenger compartment connected to said circuit.

13. The system according to claim 10, characterized in that:
    the electric heater has a power greater than or equal to 5 kW, and/or
    the combustion heater has a power greater than or equal to 15 kW.

14. An electric vehicle comprising:
    a heating system according to claim 10; or
    means for implementing all the steps of the method according to a method for heating the passenger compartment of an electric vehicle in which all of the energy for the movement thereof is provided by an on board electrical energy source that can be recharged from an external source, said method comprising the following steps:
    pre-heating at least one part of said passenger compartment by at least one electric heater when said vehicle is connected to an external energy source;

heating said at least one part of said passenger compartment by a combustion heater when said vehicle is in use; and the pre-heating step carries out pre-heating only of a driver's area of said vehicle.

15. The electric vehicle according to claim 14, characterized in that it is an electric public transport land vehicle.

16. The electric vehicle according to claim 14, characterized in that it is a bus, a coach or a tyred tram.

* * * * *